July 31, 1951     O. H. BANKER     2,562,255
ROTARY VALVE Filed Nov. 2, 1945     3 Sheets-Sheet 1

INVENTOR.
Oscar H. Banker
BY
Cromwell, Greist & Warden
ATTORNEYS

July 31, 1951  O. H. BANKER  2,562,255
ROTARY VALVE

Filed Nov. 2, 1945  3 Sheets-Sheet 2

INVENTOR.
Oscar H. Banker
BY
Cromwell, Greist & Warden
ATTORNEYS

July 31, 1951     O. H. BANKER     2,562,255
ROTARY VALVE Filed Nov. 2, 1945     3 Sheets-Sheet 3

INVENTOR.
Oscar H. Banker
BY
Cromwell, Greist & Warden
ATTORNEYS

Patented July 31, 1951

2,562,255

UNITED STATES PATENT OFFICE 2,562,255

ROTARY VALVE

Oscar H. Banker, Evanston, Ill., assignor to New Products Corporation, Chicago, Ill., a corporation of Delaware Application November 2, 1945, Serial No. 626,311

22 Claims. (Cl. 277—25)

This invention pertains generally to improvements in a rotary valve, being directed in particular to a valve having a compound rotary and axially shifting member controlling the flow of fluid to one of a plurality of pressure lines or cutting off circulation to said lines.

It is an object of the invention to provide such rotary valve which is exceedingly simple and inexpensive in its parts, and which functions, when directing the hydraulic pressure through one of said lines, to relieve or neutralize the pressure existing in the other lines.

More specifically, an object is to provide a valve of the type described having a rotary action in controlling the distribution of hydraulic pressure in a plurality of individual pressure lines, and an axial movement to shut off flow through the valve entirely, thereby relieving pressure in all of the lines and placing a mechanism controlled by the valve in a neutral condition.

A still further object is to provide a rotary valve of the type described in which internal back pressure is compensated or equalized, in a manner to minimize resistance to the aforesaid axial movement.

Yet another object of the invention is to provide a rotary valve of the type described, in combination with a safety by-pass or pressure relief device whereby fluid pressure in excess of a predetermined operative pressure is by-passed around the valve and returned to its source or to another point.

A further object is to provide a valve of small compact size which is adapted to function perfectly regardless of any angularity or inclination in the positioning thereof.

A further object is to provide a rotary valve of the type described which affords any desired distribution of hydraulic power through one or a plurality of power take-off lines, and which enables a slow, smooth controlling action in the transfer of hydraulic power from one of the lines to the other, coupled with a very rapid return to neutral position by bleeding all of said lines, and furthermore, in which, in normal operation, the unselected power lines are rapidly bled to relieve the same of hydraulic fluid.

A still further object is to provide a valve of the type described which is readily manufactured and assembled, which is manually operable with ease, which is leak-proof, which is not subject to destructive wear such as would minimize its effective length of life, and which, other than two check members, has but a single internal moving part.

The foregoing statements are indicative in a general way of the nature of the invention, but other and more specific objects will be apparent to those skilled in the art upon a full understanding of the construction and operation of the device.

One embodiment of the invention is presented herein for the purpose of exemplification, but it will be appreciated that the invention is susceptible of incorporation in other modified forms coming equally within the scope of the appended claims.

This invention relates to improvements in a rotary valve, which, although the features thereof are susceptible of general application wherever a rotary valve is desired, has particular utility in connection with the operation of a hydraulically controlled, planetary type transmission such as illustrated in my copending application Serial No. 588,222, filed April 13, 1945, now Patent Number 2,486,815 issued November 1, 1949. In such an adaptation the valve functions to control the communication of hydraulic pressure with one of a plurality of brake and/or clutch actuating devices, whereby the operation of the planetary system is controlled in neutral, low, second, high, or reverse speed. In the copending application referred to, a reciprocating plunger type of valve structure is illustrated, and the present rotary valve was primarily designed to perform all of the functions of such a plunger valve, while being embodied in a structure of a greatly simplified, less expensive and more readily, progressively operated nature. Therefore, in the specification to follow, the present valve will be described with particular reference to its applicability as a transmission controlling device; however, it should be distinctly and clearly understood that it is equally suitable for use in other applications not necessarily related to the transmission field.

Figures 1, 8:
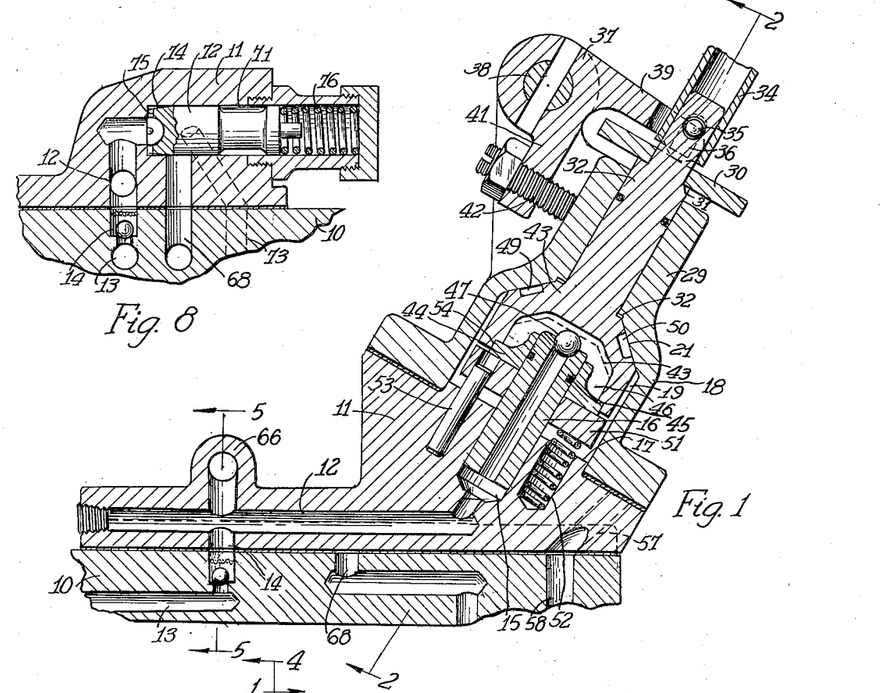
Fig. 1 is a fragmentary view in vertical section through the valve of the invention, illustrating the same in operative relation to a mounting base, such as a transmission housing, this view being taken along a line generally corresponding to line 1—1 of Figs. 2, 3 and 6.
Fig. 8 is a view generally similar to Fig. 5, illustrating a somewhat modified form of pressure regulator or relief and lubricating construction, according to this invention.
Figure 2:
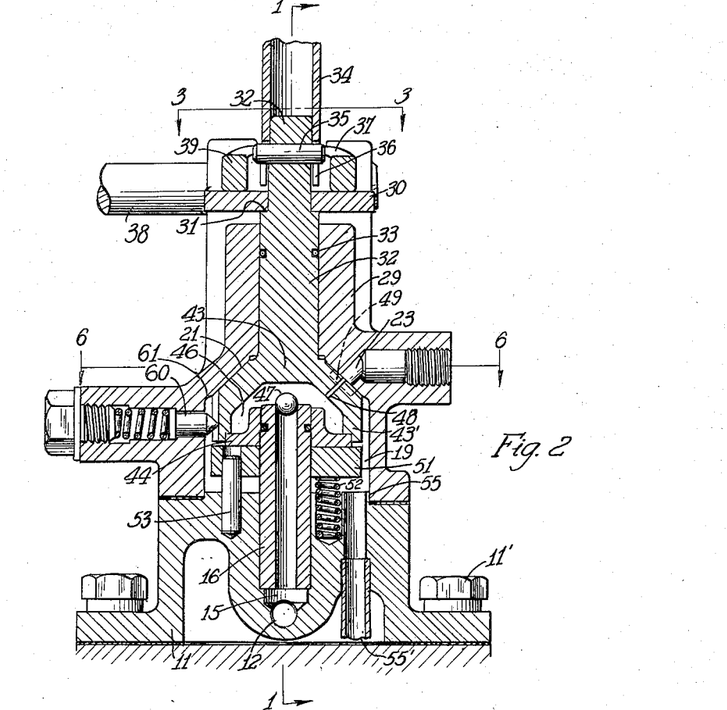
Fig. 2 is a fragmentary view in longitudinal section on a line corresponding generally to line 2—2 of Figs. 1, 3 and 6, further illustrating details of structure of the valve.

Referring to the drawings, and in particular to Figs. 1 and 2 thereof, the reference numeral 10 in general designates a fixed base or support for the present valve. In the form illustrated this support may be regarded as a transmission housing, being provided with liquid flow passages generally similar to those embodied in the transmission of application Serial No. 588,222 referred to above. A cast valve base or body 11 is secured on support 10 by bolts 11', this body being provided with a liquid inlet passage 12 which is in communication with a supply duct or passage 13, the latter being illustrated as being cored out in the support 10. Passage 13 is suitably connected with a source of hydraulic pressure fluid such as a good grade of lubricating oil, and communication between the passages 12, 13 is provided by a connecting duct 14 extending between the same.

At the right-hand end of passage 12 the body 11 has an angularly inclined, cylindrical recess 15 in communication with the supply passage 12, said recess 15 having a tubular valve insert or sleeve 16 telescoped therein with a force fit whereby to be fixedly secured to the body 11, projecting normal to the angular outer surface 17 of said body, as clearly illustrated in Fig. 1.

Figure 3:
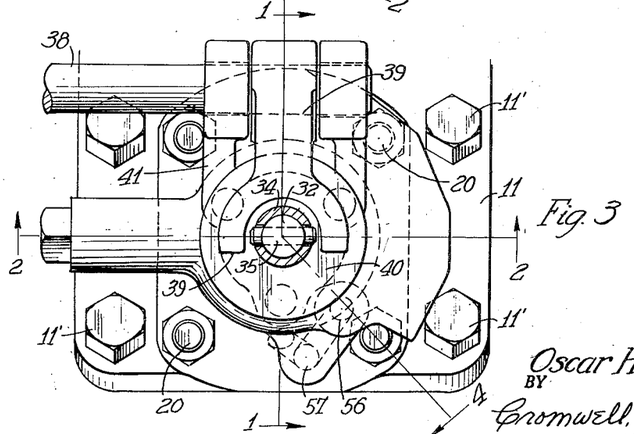
Fig. 3 is an external view of the valve structure, sectioned on line 3—3 of Fig. 2.

A hollow head casting or valve block 18 coacts with the body 11 in defining an inner valve housing 19, the head casting being secured over a central boss on the adjacent surface 17 of the body by bolts or studs 20 (see Fig. 3). On its hollow interior surface the housing 19 is machined at 21 to provide an inclined peripheral or conical valve seat surface, which surface has a plurality of valve ports 22, 23, 24 and 24' communicating therethrough in the manner illustrated in Fig. 6, the ports 22, 23 and 24 extending through the wall of the head casting and provided with threaded fittings 25 by which the ports are connected in hydraulic pressure-transmitting relation with the pressure outlet pipes 26, 27 and 28.

These last named pipes 26, 27, 28 serve to transmit hydraulic pressure to pistons, plungers, diaphragms or the like for any desired purpose and, as an example thereof, reference should be made to the above identified copending application Serial No. 588,222 embodying the control of a planetary system by hydraulic means, wherein pressure in said lines controls operation of brake and clutch devices of the transmission in low, intermediate or reverse speed ratios. Also, as illustrated in said application and in a manner to be further referred to, the further port 24' is connected in a pressure line through the valve body, to control high speed ratio in the operation of the transmission referred to. However, in so far as this application relates solely to valve structure and operation, the outlet ports 22, 23, 24 and 24' may be regarded as merely exemplary of a plurality of outlet pressure lines controlled by the valve.

Referring to Figs. 1 and 2, the head casting 18, outwardly of the internal housing 19, is provided with an elongated boss or neck, coaxial with the aforesaid fixed base sleeve 16, said neck being designated 29. This neck is bored out concentric with the sleeve 16 and has mounted therein for axial and rotative sliding movement a valve control stem 32, an O-ring 33 surrounding said stem to prevent leakage between the stem and neck. This stem is freely rotatable in the neck 29 for selective control of a valve member in a manner to be described, being manually actuated for such rotation from a hollow tubular control rod 34. A pin 35 carried by the stem 32 and projecting at either end into slots 36 at the lower end of the tubular rod 34 serves to couple the rod and stem for rotary actuation of the latter, while relative axial movement of the stem relative to the rod 34 is permitted.

Stem 32 may also be shifted axially downwardly, independently of the aforesaid rotary movement, by means of a bell crank 37 secured to a stub shaft 38 which is oscillatably journaled adjacent the neck boss 29. One arm of said bell crank, designated 39, is forked to straddle the control rod 34 and to bear against a thrust or throw-out ring 30 which encircles stem 32 in thrust transmitting relation to a shoulder 31 thereon, while the other end of the bell crank, designated 41, carries an adjustable stop screw 42 engageable with the exterior of boss 29 to limit the counterclockwise outward throw of bell crank 37. This bell crank is actuable in clockwise direction upon rotation of shaft 38 by any appropriate pedal or manually controlled instrumentality located conveniently to the operator to shift the ring 30 and stem 32 axially toward the valve housing 19. This movement is availed of in a manner to be described.

At its opposite end the control stem 32 is integrally connected to a rotatable, bell shaped valve designated 43. This is a hollow, bell shaped element having an annular wall 43' concentric with the stem and machined on its outer surface to provide an annular inclined or conical land which is normally in close, rotatable sealing engagement with the valve seating surface 21 on the interior of housing 19. At its outer end the valve member 43 is hydrogen brazed to a ring 44 of L-shaped section, which is slidable on the fixed sleeve 16 of the valve. An annular rubber O-ring 45 interposed between said ring 44 and sleeve 16 serves to prevent leakage at this point.

The forming of the valve member 43 with the annular ring 44 integrally connected thereto provides a distribution chamber 46 internally of the valve whereby the back pressure effective on member 43, which, unless counteracted, would urge the same with excessive pressure against the seating surface 21, is substantially reduced. Thus, with the structure as described, assuming a working pressure of about 100 pounds per square inch in distribution chamber 46, the only part of this pressure which is effective to throw the member 43 upwardly against seat 21 is that acting on an area of said member corresponding to the cross-sectional area of the sleeve 16, since the pressure on the remaining area of the member 43 is offset by that on an oppositely facing area integrally connected to said member. This factor is important in reduction of the force necessary on stem 32 to shift the bell valve member 43 axially, in the manner to be described.

A ball check 47 is seated in a semi-spherical depression on the end of sleeve 16 concentrically of its hollow internal passage, the proportioning and location of the ball relative to the sleeve being such that the ball 47 may not roll outwardly and be displaced permanently from the sleeve under any condition. However, this ball is adapted to be positively held against its seat, terminating flow through inlet sleeve 16, when valve 43 is moved downwardly thereagainst, to the position indicated by dotted lines in Fig. 1. Such movement of valve 43 results from the above described axial shifting of the valve stem 32 by fork 39.

A distributing duct or port 48 of small cross-sectional area as compared to that of the outlet ports is formed in the conical land of the bell shaped valve member 43, communicating the inner liquid distribution chamber 46 thereof with one or the other of the ports 22, 23, 24, 24', depending upon the angular position of said valve member. Said conical land is also provided with elongated grooves 49, 50 at either side of the duct 48, the purpose of which will be explained.

On its lower side the ring 44, which constitutes part of the hollow valve member referred to, engages axially against an apertured thrust disk 51 which is slidable on fixed inlet sleeve 16. Said thrust disk is urged against the valve by means of a plurality of coil compression springs 52, being guided by pins 53 carried by the valve body 11 and telescopingly engageable in apertures 54 in the thrust ring. Such pins prevent rotative shifting of disk 51 upon angular adjustment of valve member 43. Alternatively, other equivalent means may serve as the source of thrust, in place of a plurality of springs. The purpose of such resilient thrust provisions is to preserve the sealing engagement of the external conical valve land with the conical seat 21 under a minimum force of about 10 pounds, also to maintain contact of the valve throw-out ring 30 with the shifter fork 39.

Figure 4:
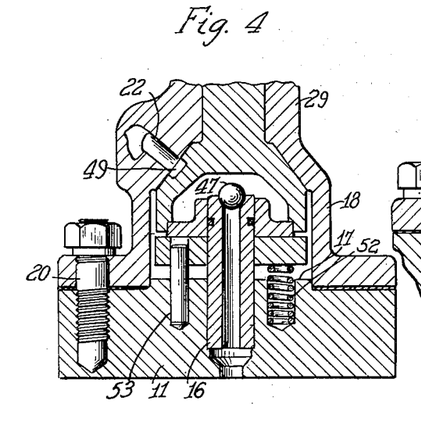
Fig. 4 is a fragmentary view sectioned on line 4—4 of Fig. 3, illustrating a pressure release feature of the structure enabling all output lines to be restored to neutral condition.

Referring to Fig. 2, it will be noted that the valve body 11 is provided with a liquid return passage 55 in communication with the interior of the valve housing 19. The purpose of this is to bleed the pressure lines which are not in communication with the distribution chamber 46. Thus, assuming that the control valve 43 is angularly positioned so that its distribution port 48 is aligned with one of the outlet ports, for example the outlet port 23, as illustrated in Fig. 2, then the groove 49 in its conical land will be in communication with one of the other ports, 22, and the corresponding opposite groove 50 in communication with the remaining ports 24, 24'. See Figs. 4 and 6 At one end thereof each of the aforesaid grooves 49, 50 communicate, through a radial escape passage 50' at an end thereof (see Fig. 6), with the annular space surrounding valve member 43, so that the output ports 22, 24, 24' and connected pressure lines which are not in communication with the interior of the valve member 43 are simultaneously bled through passage 55 and relieved of pressure. Preferably this is accomplished through a sealed line including a tube 55' communicating with passage 55 and led to an oil sump or reservoir below the liquid level therein, thus preventing the entry of air into the hydraulic line.

In addition to the three separate pressure conduits 26, 27, 28 connected respectively to output ports 22, 23, 24, the valve head casting 18 is provided with a further passage 56 (see Figs. 3 and 6) opening to port 24', which is connected by further passage means 57 in the body casting, then with a passage 58 in the mounting base, i. e., the transmission housing 10. As illustrated and fully described in my copending application Serial No. 588,222, the application of hydraulic pressure in this passage is available for the control of a cylinder controlling high speed operation, generally in the same manner as the pressure available in the conduits 26, 27, 28 is employed in controlling low, intermediate and reverse speeds. Generally considered, in so far as the present valve construction is concerned, it makes little difference whether the hydraulic pressure is communicated through separate external conduits or through passages internally of the valve structure, or otherwise; however, I mention this fact in order that the details of the herein described valve construction may be correlated in their functioning with the operation of the hydraulic transmission referred to, in connection with which the present rotary valve finds its preferred application.

A shut-off portion 21' is provided in the space on the valve seating surface 21 located circumferentially between outlet port 23 (controlling low speed ratio of the transmission) and outlet port 22 (controlling reverse drive) at which the distribution duct or port 48 of the valve member may be positioned to shut off flow to any line without unseating the valve member. This enables all standard speed ratios plus a conventional neutral position to be had. The ports 24 and 24' govern intermediate and high speed ratios.

Figure 6:
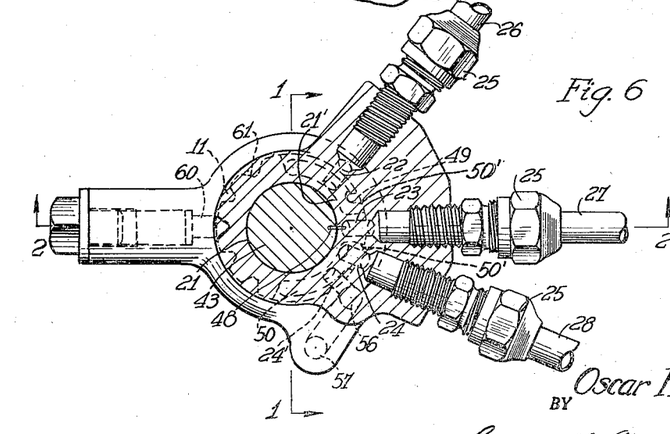
Fig. 6 is a fragmentary section on a line corresponding to line 6—6 of Fig. 2, further illustrating the valve outlet structure.
Figure 7:
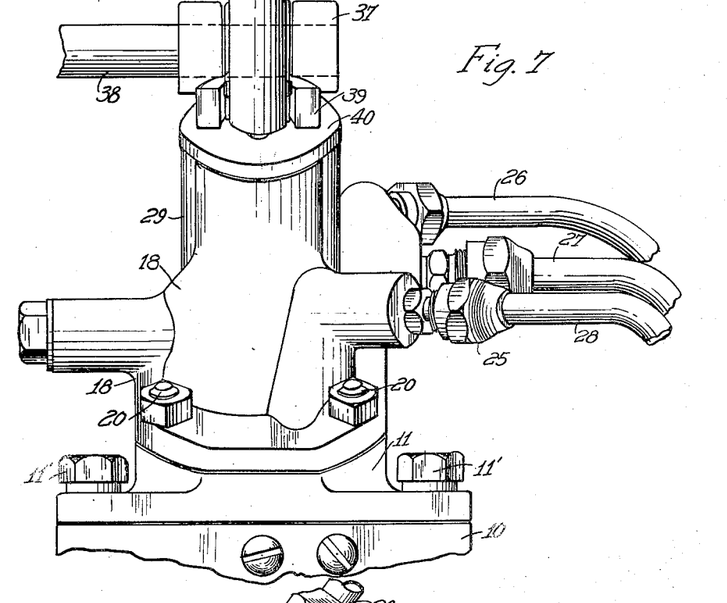
Fig. 7 is a plan view still further illustrating the valve structure, including the pressure outlet lines which are controlled by the valve.

In operation, the hydraulic fluid, from a suitable source, is applied under pressure of say 100 pounds per square inch through the passage 13 and connecting passages 12, 14, displacing the ball check 47, so that the distribution chamber 46 is under a corresponding pressure. In accordance with the angular positioning of the bell valve member 43, one or the other of pressure conduits 26, 27, 28 or 57 is subjected to the full hydraulic pressure of the chamber. Such angular position of the valve is determined by a spring urged detent pin 60 slidably mounted in a recess in the head casting, as illustrated in Figs. 2 and 6, and, yieldably engageable with serrations 61 or the like on the outside of the valve member 43. The other pressure lines are automatically bled through the respective external grooves 49 or 50, which are of appropriate length to accomplish this purpose, through the by-pass port 55. In this manner, selective actuation of any one of a plurality of devices, such as the brakes or clutch of the transmission referred to above, is governed simply by the manual rotation of the valve 43 through the control stem 32 therefor. The conical valve land or surface is held against the conical seat 21 by a hydraulic pressure which is a fraction of the pressure available, by reason of the internally pressure-compensated feature of the valve, so that undue frictional resistance to such turning movement does not develop, and the spring urged detent pin 60 insures perfect registry of port 48 with any of the outlet ports 22, 23, 24, 24' or at the neutral position 21'.

In the event it is desired to throw the transmission referred to into neutral or de-activate the devices controlled by the present valve, it is simply necessary to actuate shaft 38 through a pedal or manual control to swing the bell crank 37 in clockwise direction, the fork 39 of the latter engaging throw-out ring 30 which in turn causes stem 32 to urge the bell valve member 43 axially into engagement with ball check 47. This cuts off flow entirely through the valve inlet sleeve and, since the bell member 43 has been disengaged from its seat 21, whatever pressure exists in any of the output lines is immediately bled externally of the valve member 43 through passage 55. As a result, the system controlled will be in a neutral condition. Passage 55 will preferably bleed the pressure fluid back to the transmission or to its source. In cutting off flow through inlet sleeve 16, the seated ball check 47 insures perfect lubrication of the controlled mechanism or transmission, through the provisions to be described. At no time will such mechanism be starved of oil.

Figure 5:
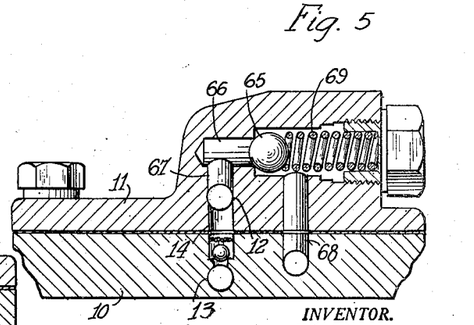
Fig. 5 is a fragmentary section along a line corresponding to line 5—5 of Fig. 1, showing a pressure regulating by-pass feature.

Referring to Fig. 5, wherein a further safety or pressure regulator feature of the invention is illustrated, the reference numeral 65 designates a spring-loaded ball check which controls the flow through a liquid duct 66, the latter being communicated with the supply passage 12 by means of a connecting duct 67. On the downstream side of the ball check 65 a conduit 68 serves to discharge liquid by-passed through said check member to an appropriate point, such as the liquid source or, preferably, back to the transmission housing to lubricate various parts thereof. This occurs when the ball check 47 is seated in the manner referred to, or at any time when the pressure effective on the ball check 65 exceeds the force of the spring 69, which is chosen to resist a hydraulic force up to any desired operating pressure, say 100 pounds per square inch, but to yield to forces in excess of that value. Thus, in normal operation, a full 100 pounds per square inch is available through any one of the various conduits 26, 27, 28 or 58, selected in accordance with the angular positioning of the bell valve 43, any pressure in excess of that amount being by-passed at the ball check 65 and back to its source or to a lubricating line. Also, as stated above, when the stem 32 is shifted downwardly to hold the main ball check 47 against the sleeve, cutting off flow therepast, the entire quantity of liquid is by-passed for such lubrication.

Reference has been made to the small area of cross section of duct or port 48 as compared to that of the outlet ports 22, 23, 24, 24' with which the distribution port 48 is selectively brought into register. The purpose of this is to insure a relatively slow and perfectly smooth transfer of hydraulic power from one line to the other, for a smooth transition between speed ratios, without, however, sacrificing rapidity of de-actuation of the non-selected hydraulic line or lines. Thus just as soon as the port or duct 48 has moved away from one of the outlet ports, this port and all other non-selected ports are immediately bled to passage 55 through conduits of relatively large area. In combination with the smooth shift in ratios, this rapidity of neutralization of the non-selected lines is of extreme importance in the invention.

In Fig. 8 I illustrate a somewhat modified embodiment of a pressure regulator or relief which may be employed in substitution for that illustrated in Fig. 5. In this form, the valve base 11 is bored to provide a cylinder 71 which slidably receives a pressure regulator plunger 72. As in the embodiment of Fig. 5, this cylinder is communicated with the liquid supply line at one end and has a conduit 68, preferably leading to a lubrication line. A still further liquid discharge line 73 communicates the cylinder 71 at a point rearwardly of the conduit 68, with reference to the liquid inlet, with a suitable oil reservoir or sump.

It will be noted that the plunger 72, at its forward end 74, has a slight peripheral taper or bevel and on its nose is radially slotted at 75, so that inlet pressure is effective through the slots with the annular space surrounding the taper referred to. The angularity of this taper is exaggerated somewhat in Fig. 8 for clarity of illustration and it extends axially sufficiently to overlap in a very slight degree the conduit 68 leading to the lubrication system of the control mechanism, i. e., the transmission. A coil compression spring 76 serves to urge the plunger 72 to the left as viewed in Fig. 8.

Under certain conditions of temperature, or when either an excessively light or viscous oil is employed, it has been found that insufficient lubrication for the transmission may result. Thus a hot light oil might afford insufficient pressure to unseat the ball check 65, but the structure of Fig. 8 enables a certain amount of said oil to escape past the tapered peripheral space surrounding the inclined periphery of plunger 72 into the lubricating conduit 68. As a result, regardless of the position of plunger 72, an adequate degree of lubrication prevails. As the pressure rises to and above the desired operating pressure, the plunger yields rearwardly, a spring 76 being appropriately chosen to this end, to expose more and more of conduit 68. When the oil is cold, the pressure in the supply line rises, and should a substantial excess over the desired operating pressure occur, then this is immediately relieved by rearward travel of the plunger and exposure of the discharge lines 68, 73. This pressure regulator and lubricating control device is simple in character and safeguards the system from failure under either opposite extreme of liquid viscosity.

It is believed that the advantages of the present valve will be apparent from the foregoing description. It is exceedingly compact and simple in construction. The feature of hydraulic compensation for back pressure enables a fully effective seat of the member 43 against the valve seating surface 21 under a force acting on only a fraction of the existing pressure area thereof, rather than under such a force as would cause undue friction at the valve seat or substantially resist axial shifting movement of the stem 32 and valve. A very smooth control of a multiplicity of pressure lines is made possible by simple angular controlling movement, and an equally simple and easy longitudinal shifting movement serves to de-activate all of the lines. Rapid bleeding and de-activation of any un-selected line is insured, notwithstanding the smooth transition in ratios made possible by the small distribution duct in valve member 43.

What I claim is:

1. In a valve, a valve housing having an inlet port which is in communication with a source of fluid pressure, a check member coacting with the inner end of said port, and a hollow annular valve member rotatably and axially slidably mounted within said housing and defining an internal distribution chamber therein surrounding the port, said check member normally permitting flow through said port to said chamber, said valve member being engageable with said check member upon axial sliding movement to hold the same in sealing relation to the port, said housing having a seating surface and said valve member having an external sealing surface slidably coacting with said surface upon rotary movement of said valve member, there being a distribution port extending through said valve member to connect said distribution chamber with said surfaces, and outlet means in said housing opening to said seating surface and selectively communicable with said distribution port in accordance with the angular positioning of the valve member and distribution port, there being means to bleed the outlet means in cut-off position of the valve member.

2. In a valve, a valve housing having an inlet port which is in communication with a source of fluid pressure, a check member coacting with the inner end of said port, and a hollow annular valve member rotatably and axially slidably mounted within said housing and defining an internal distribution chamber therein surrounding the port, said check member normally permitting flow through said port to said chamber, said valve member being engageable with said check member upon axial sliding movement to hold the same in sealing relation to the port, said housing having an internal, annular, conical seating surface and said valve member having an external conical sealing surface slidably coacting with said surface upon rotary movement of said valve member, means urging said surfaces together axially, there being a distribution port extending through said valve member to connect said distribution chamber with said surfaces, and outlet means in said housing opening to said seating surface and selectively communicable with said distribution port in accordance with the angular positioning of the valve member and distribution port, there being means to bleed the outlet means in cut-off position of the valve member.

3. In a valve, a valve housing having a tubular member projecting therein and terminating in an inlet port which is in communication with a source of fluid pressure, a check member coacting with the inner end of said port, and a hollow annular valve member rotatably and axially slidably sleeved on said tubular member within said housing and defining an internal distribution chamber therein surrounding the port, said check member normally permitting flow through said port to said chamber, said valve member being engageable with said check member upon axial sliding movement to hold the same in sealing relation to the port, said housing having a seating surface and said valve member having an external sealing surface slidably coacting with said surface upon rotary movement of said valve member, there being a distribution port extending through said valve member to connect said distribution chamber with said surfaces, and outlet means in said housing opening to said seating surface and selectively communicable with said distribution port in accordance with the angular positioning of the valve member and distribution port, there being means to bleed the outlet means in cut-off position of the valve member.

4. In a valve, a valve housing having a tubular member projecting therein and terminating in an inlet port which is in communication with a source of fluid pressure, a check member coacting with the inner end of said port, and a hollow annular valve member rotatably and axially slidably sleeved on said tubular member within said housing and defining an internal distribution chamber therein surrounding the port, said check member normally permitting flow through said port to said chamber, said valve member being engageable with said check member upon axial sliding movement to hold the same in sealing relation to the port, said housing having an internal, annular, conical seating surface and said valve member having an external conical sealing surface slidably coacting with said surface upon rotary movement of said valve member, means urging said surfaces together axially there being a distribution port extending through said valve member to connect said distribution chamber with said surfaces, and outlet means in said housing opening to said seating surface and selectively communicable with said distribution port in accordance with the angular positioning of the valve member and distribution port, there being means to bleed the outlet means in cut-off position of the valve member.

5. In a valve, a valve housing having an inlet port in communication with a source of fluid pressure, a check member coacting with said port, and a hollow annular valve member mounted for axial and rotative movement in the housing relative to the port and defining a distribution chamber surrounding the port, the check member normally permitting flow through said port to the chamber, said valve member being axially movable to engage said check member to hold the same in sealing relation to the port, said housing having an internal seating surface on a side thereof remote from the port and said valve member having an external sealing surface slidably coacting with said surface in normal position of the valve member, there being a radial distribution port through said valve member connecting said surfaces with the interior of the distribution chamber, a plurality of outlet passages opening to said seating surface and selectively communicable with said distribution port in accordance with the angular positioning of the valve member and distribution port, and means to bleed the non-selected conduits in normal position of the valve member and to bleed all the conduits in cut-off position thereof.

6. In a valve, a valve housing having an inlet port in communication with a source of fluid pressure, a check member coacting with said port, and a hollow annular valve member mounted for axial and rotative movement in the housing relative to the port and defining a distribution chamber surrounding the port, said valve member having opposed, axially spaced, pressure compensating surfaces of substantial area in said chamber, the check member normally permitting flow through said port to the chamber, said valve member being axially movable to engage said check member to hold the same in sealing relation to the port, said housing having an internal seating surface on a side thereof remote from the port and said valve member having an external sealing surface slidably coacting with said surface in normal position of the valve member, there being a distribution port through said valve member connecting said surfaces with the interior of the distribution chamber, and a plurality of outlet passages opening to said seating surface and selectively communicable with said distribution port in accordance with the angular positioning of the valve member and distribution port.

7. In a valve, a valve housing having an inlet port in communication with a source of fluid pressure, a check member coacting with said port, and a hollow annular valve member mounted for axial and rotative movement in the housing relative to the port and defining a distribution chamber surrounding the port, said valve member having opposed, axially spaced, pressure compensating surfaces of substantial area in said chamber, the check member normally permitting flow through said port to the chamber, said valve member being axially movable to engage said check member to hold the same in sealing relation to the port, said housing having an internal conical seating surface on a side thereof remote from the port and said valve member having an external conical sealing surface slidably coacting with said surface in normal position of the valve member, spring means urging said surfaces together, there being a radial distribution port through said valve member connecting said surfaces with the interior of the distribution chamber, and a plurality of outlet passages opening to said seating surface and selectively communicable with said distribution port in accordance with the angular positioning of the valve member and distribution port.

8. In a valve, a valve housing, a tubular inlet member defining a port, said member and port extending into said housing and being in communication with a source of fluid pressure, a check member coacting with said port, and an annular valve member comprising a bell shaped element having a connected radial wall slidably and rotatably sleeved on said tubular member within said housing to define a distribution chamber surrounding the port, said check member normally permitting fluid flow through the port to the chamber interior and said wall compensating an opposed internal surface in said element to minimize axial force on the valve member in the direction of said surface, said valve member being engageable with said check member upon axial movement thereof to hold the check member in sealing relation to the port, said housing having an internal seating surface and said valve member having an external sealing surface engaging said seating surface in normal position of the valve member, there being a distribution port in said valve member connecting said last named surfaces with the interior of the distribution chamber, said housing having outlet means opening to said seating surface and communicable with said distribution port in accordance with the angular positioning of the valve member.

9. In a valve of the type described, a valve housing having an inlet and a seating area provided with a plurality of outlet ports, a hollow valve member mounted over said inlet for rotary and axial adjustment in said housing and axially engaging with said area in said rotary adjustment, said member having a distribution port selectively communicable with the outlet ports of said housing in accordance with the rotary positioning of the valve member, a supply passage to said inlet connected to a source of liquid under pressure, and a by-pass having a spring-loaded check member disposed in communication with said passage in advance of said inlet to by-pass liquid therein at pressures in excess of a predetermined pressure, said inlet having a check member coacting therewith and said valve member being axially adjustable to engage said last named check member to control flow of fluid through said inlet.

10. In a valve of the type described, a valve housing having an inlet and a seating area provided with a plurality of outlet ports, a hollow valve member mounted over said inlet for rotary and axial adjustment in said housing and axially engaging with said area in said rotary adjustment, said member having a distribution port selectively communicable with the outlet ports of said housing in accordance with the rotary positioning of the valve member, a supply passage to said inlet connected to a source of liquid under pressure, and a by-pass having a spring-loaded check member disposed in communication with said passage in advance of said inlet to by-pass liquid therein at pressures in excess of a predetermined pressure, said inlet having a check member coacting therewith and said valve member being axially adjustable to engage said last named check member to control flow of fluid through said inlet, the housing bleeding the outlet ports upon axial adjustment of the valve member and resultant disengagement of the same from said seating area.

11. In a valve of the type described, a valve housing having an inlet and a seating area provided with a plurality of outlet ports, a hollow valve member mounted over said inlet for rotary and axial adjustment in said housing and axially engaging with said area in said rotary adjustment, said member having distribution ports selectively communicable with the outlet port of said housing in accordance with the rotary positioning of the valve member, a supply passage to said inlet connected to a source of liquid under pressure, and a by-pass having a spring-loaded check member disposed in communication with said passage in advance of said inlet to by-pass liquid therein at pressures in excess of a predetermined pressure, said inlet having a check member coacting therewith and said valve member being axially adjustable to engage said last named check member to control flow of fluid through said inlet, said valve member having means to bleed the unselected outlet ports during said rotary adjustment and the housing bleeding the outlet ports upon axial adjustment of the valve member and resultant disengagement of the same from said seating area.

12. In a valve of the type described, a valve housing having inlet and outlet ports therein, a hollow valve member mounted over said inlet port for rotary and axial movement in said chamber and controlling the outlet ports in said rotary movement, said valve member having a duct to communicate the interior of the member with a selected outlet port in accordance with the rotary positioning of the valve member, an inlet passage to said inlet port connected to a source of liquid under pressure, and a by-pass having a spring-loaded check valve communicating with said passage in advance of said inlet port to by-pass liquid under pressure in excess of a predetermined pressure, said inlet port having a check member coacting therewith and said valve member being engageable with said check member upon axial movement of the valve member to control flow of fluid through said inlet port.

13. In a valve of the type described, a valve housing having inlet and outlet ports therein, a hollow valve member mounted over said inlet port for rotary and axial movement in said chamber and controlling the outlet ports in said rotary movement, said valve member having a duct to communicate the interior of the member with a selected outlet port in accordance with the rotary positioning of the valve member, an inlet passage to said inlet port connected to a source of liquid under pressure, and a by-pass having a spring-loaded check valve communicating with said passage in advance of said inlet port to by-pass liquid under pressure in excess of a predetermined pressure, said inlet port having a check member coacting therewith and said valve member being engageable with said check member upon axial movement of the valve member to control flow of fluid through said inlet port, said valve member disengaging said outlet ports in said axial movement, whereby the latter are bled to the housing interior externally of the valve member.

14. A valve, comprising a hollow valve housing having an inlet port, a hollow valve member rotatable in said housing in concentric, sealing relation to said port and providing a chamber exposed to said port, an external sealing surface and a duct of small cross-sectional area communicating said surface with the interior of said chamber, said housing having an internal seating surface normally engageable with said sealing surface and an outlet port opening to said seating surface which is of substantially larger cross-sectional area than said duct, and means for rotatably shifting said valve member to control communication of said duct with said outlet port.

15. A valve, comprising a hollow valve housing having an inlet port, a hollow valve member rotatable in said housing in concentric, sealing relation to said port and providing a chamber exposed to said port, an external conical sealing surface and a duct of small cross-sectional area communicating said surface with the interior of said chamber, said housing having an internal conical seating surface normally engageable with said sealing surface and an outlet port opening to said seating surface which is of substantially larger cross-sectional area than said duct, means resiliently urging said surfaces together, and means for rotatably shifting said valve member to control communication of said duct with said outlet port.

16. A valve, comprising a hollow valve housing having an inlet port, a hollow valve member rotatable in said housing and shiftable longitudinally of its axis of rotation, said valve member defining a chamber surrounding said port, a check member coacting with said inlet port which is engageable by the valve member upon said axial shifting movement thereof to hold the check member in sealing relation to said port, said valve member having an external sealing surface and a duct of small cross-sectional area communicating said surface with the interior of said chamber, said housing having an internal seating surface normally engageable with said sealing surface and an outlet port opening to the interior of the housing at said seating surface which is of substantially larger cross-sectional area than said duct, said outlet port voiding fluid to said housing interior externally of said valve member when said surfaces are disengaged, means for axially and rotatably shifting said valve member to respectively disengage said surfaces or hold the check member against said inlet port and to control communication of said duct with said outlet port, and means to discharge voided fluid from said housing interior.

17. A valve, comprising a hollow valve housing having an inlet port, a hollow valve member rotatable in said housing and shiftable longitudinally of its axis of rotation, said valve member defining a chamber surrounding said port, a check member coacting with said inlet port which is engageable by the valve member upon said axial shifting movement thereof to hold the check member in sealing relation to said port, said valve member having an external sealing surface and a duct of small cross-sectional area communicating said surface with the interior of said chamber, said housing having an internal seating surface normally axially engageable with said sealing surface and an outlet port opening to the interior of the housing at said seating surface which is of substantially larger cross-sectional area than said duct, said outlet port voiding fluid to said housing interior externally of said valve member when said surfaces are disengaged, means for axially and rotatably shifting said valve member to respectively hold the check member against said inlet port while axially disengaging said surfaces and to control communication of said duct with said outlet port, and means to discharge voided fluid from said housing interior.

18. A fluid control valve comprising a hollow housing provided with an inlet port and an internal valve seating surface having outlets therein, a valve member rotatable and axially shiftable in said housing and provided with a sealing surface which is slidably engageable with said housing seating surface, said sealing surface having a distributing duct therein which is adapted to be positioned in communication with a selected outlet by rotative positioning of said valve member, said sealing surface disengaging a non-selected outlet in said last named position of said valve member whereby to void fluid under pressure therefrom, and a check member actuable to control said inlet port, said valve member being axially shiftable to engage and actuate said check member.

19. A fluid control valve comprising a hollow housing provided with an inlet port and an internal valve seating surface having outlets therein, a valve member rotatable in said housing and provided with a sealing surface which is slidably engageable with said housing seating surface, said sealing surface having a distributing duct therein of relatively small capacity as compared to that of said respective outlets which is adapted to be positioned in communication with a selected outlet by rotative positioning of said valve member, said sealing surface disengaging a non-selected outlet in said last named position of said valve member whereby to void fluid under pressure therefrom, and a check member actuable to control said inlet port.

20. A fluid control valve comprising a hollow housing provided with an inlet port and an internal valve seating surface having outlets therein, a valve member rotatable and axially shiftable in said housing and provided with a sealing surface which is slidably engageable with said housing seating surface, said sealing surface having a distributing duct therein of relatively small capacity as compared to that of said respective outlets which is adapted to be positioned in communication with a selected outlet by rotative positioning of said valve member, said sealing surface disengaging a non-selected outlet in said last named position of said valve member whereby to void fluid under pressure therefrom, and a check member actuable to control said inlet port, said valve member being axially shiftable to engage and actuate said check member.

21. A fluid control valve comprising a hollow housing, a tubular element in said housing providing an inlet port, an internal annular valve seating surface in said housing having circumferentially spaced outlets therein, a valve actuating stem extending into said housing centrally of said surface, a valve member fixed on said stem provided with a concentric sealing surface which is rotatively slidable on said housing seating surface, means resiliently engaging said surfaces with one another, said sealing surface having a distributing duct therein of relatively small capacity as compared to that of said respective outlets and being adapted to be positioned in communication with a selected outlet by rotative positioning of said valve member, said sealing surface disengaging a non-selected outlet in said last named position of said valve member whereby to void fluid under pressure therefrom, means to discharge fluid thus voided from said housing, means to rotatively and axially actuate said stem to correspondingly position said valve member, said valve member including a chamber with which said duct communicates and an annular member in fixed relation to and in part defining said chamber, said annular member slidably engaging said tubular element in the axial shifting of said valve member, and a check member in said chamber engageable by said valve member upon axial shifting thereof to engage and control said inlet port.

22. A relief device for a fluid line supplying fluid under pressure to a fluid operated instrumentality, comprising a cylinder and a spring biased plunger in said cylinder exposed to pressure in said line, said cylinder being provided with a pair of outlet ports opening through the wall thereof at points spaced axially therealong in a direction away from said line, the ports adjacent and remote from said line discharging respectively at elevated pressure to said instrumentality and at lower pressure to a low pressure receiver, said plunger normally being in substantial closing relation to said adjacent port and in fully closing relation to the remote port, but being formed adjacent the former to partially expose the same and bleed a small amount of fluid thereto at all times, said plunger being shiftable under excess pressure in said line to uncover both of said ports.

OSCAR H. BANKER.

REFERENCES CITED

The following references are of record in the file of this patent:

UNITED STATES PATENTS

| Number | Name | Date |
|---|---|---|
| 1,926,790 | Pleen | Sept. 12, 1933 |
| 1,968,390 | Hamilton | July 31, 1934 |
| 2,164,669 | Thomas | July 4, 1939 |
| 2,193,504 | Antrim | Mar. 12, 1940 |
| 2,194,541 | Buttner | Mar. 26, 1940 |
| 2,366,382 | Burton | Jan. 2, 1945 |
| 2,393,805 | Parker | Jan. 29, 1946 |